US012753002B2

(12) United States Patent
Ozbag

(10) Patent No.: US 12,753,002 B2
(45) Date of Patent: Oct. 6, 2026

(54) STORAGE SYSTEM TO BE USED FOR KEEPING HAZELNUT

(71) Applicant: BALSU GIDA SANAYI VE TICARET ANONIM SIRKETI, Sakarya (TR)

(72) Inventor: Nusret Ozbag, Sakarya (TR)

(73) Assignee: BALSU GIDA SANAYI VE TICARET ANONIM SIRKETI, Sakarya (TR)

( * ) Notice: Subject to any disclaimer, the term of this patent is extended or adjusted under 35 U.S.C. 154(b) by 457 days.

(21) Appl. No.: 18/290,454

(22) PCT Filed: Feb. 24, 2022

(86) PCT No.: PCT/TR2022/050168

§ 371 (c)(1),
(2) Date: Nov. 14, 2023

(87) PCT Pub. No.: WO2022/260621

PCT Pub. Date: Dec. 15, 2022

(65) Prior Publication Data

US 2024/0246753 A1 Jul. 25, 2024

(30) Foreign Application Priority Data

Jun. 8, 2021 (TR) ................................ 2021/009413

(51) Int. Cl.
*B65D 88/54* (2006.01)
*B65D 65/32* (2006.01)
(Continued)

(52) U.S. Cl.
CPC ........... *B65D 88/546* (2013.01); *B65G 65/32* (2013.01); *B65G 65/46* (2013.01)

(58) Field of Classification Search
CPC ................................ B65G 65/32; B65G 65/46; B65G 2201/0202; B65D 88/54
(Continued)

(56) References Cited

U.S. PATENT DOCUMENTS 4,563,844 A * 1/1986 Driedger .................... E04H 7/26 52/192
2020/0180879 A1 6/2020 Li et al.

FOREIGN PATENT DOCUMENTS

CA 1174424 A 9/1984
CN 106429510 A 2/2017
CN 111654230 A * 9/2020 ............. H02S 40/10

OTHER PUBLICATIONS

PE2E translation of Zhu, Mingfei (CN111654230A), published Sep. 11, 2020 (Year: 2020).*

* cited by examiner

*Primary Examiner* — Elizabeth Insler
(74) *Attorney, Agent, or Firm* — Bayramoglu Law Offices LLC

(57) ABSTRACT

At least one storage system with at least one chamber in which hazelnuts can be accumulated over a period of time. The novelty of the invention is characterized in that it comprises at least one feeding device that can allow the loading of hazelnuts into the chamber by means of transport elements, at least one discharge device that can allow the evacuation of the hazelnuts in the chamber by means of transport elements, at least one transfer elevator that can take the hazelnuts from the discharge device and load them into the feeding device to ensure that the hazelnuts in the chamber are at least partially circulated.

10 Claims, 3 Drawing Sheets

(51) Int. Cl.
*B65G 65/32* (2006.01)
*B65G 65/46* (2006.01)
(58) Field of Classification Search
USPC .......................................................... 366/136
See application file for complete search history.

STORAGE SYSTEM TO BE USED FOR KEEPING HAZELNUT

CROSS REFERENCE TO RELATED APPLICATIONS

This application is a national stage entry of International Application No. PCT/TR2022/050168, filed on Feb. 24, 2022, which is based upon and claims foreign priority to Turkey Patent Application No. 2021/009413, filed on Jun. 8, 2021, the entire contents of which are incorporated herein by reference.

TECHNICAL FIELD

The invention relates to at least one storage system with at least one chamber in which hazelnuts can be accumulated at least over a period of time.

BACKGROUND

Hazelnut processing facilities include the process steps of shelled hazelnuts until they are turned into hazelnut kernels. These process steps may include cracking, cleaning, packaging, etc. of the hazelnuts. Hazelnuts subjected to crushing and cleaning process in hazelnut processing plants are then offered to the market.

Hazelnut processing facilities have a certain hazelnut processing capacity. Hazelnuts outside this processing capacity are accumulated in predetermined places. A stack can be made, placed in a storage for this accumulation process or accumulated with a silo. Hazelnuts are processed by obtaining from these accumulation places as there is space in the capacity of the hazelnut processing facility. Spiral-type carriers can be used in the transportation of hazelnuts to these accumulation areas. This spiral-type carriers allow the transportation process to be carried out without damaging the hazelnuts.

There may be some problems in the accumulation of hazelnuts in this way. One of these problems is the necessity of continuous feeding of the helix used in storages or stacks. There is a constant need for personnel to feed the helices. In addition, heating problems are encountered during the accumulation of hazelnuts in storages. The fact that the hazelnut is moist may cause it to heat up after waiting for a while. The hazelnut may need to be moved from its place to another place in this case. It is necessary to carry out transportation procedures again for hazelnuts in this case.

Application No. CN106429510 known in the present art relates to a logistics storage. The logistics storage subject to the invention includes a dual body storage and an unloading device. There are two spiral conveyors in said unloading device. It can be used for granular structures such as rice, corn, soy, etc. The invention provides a solution for loading and unloading the logistics storage. No suitable studies have been carried out for processing and keeping hazelnuts and it has remained an open area for development even though storage systems are known in the present art as in this invention.

All the problems mentioned above have made it necessary to make an innovation in the relevant technical field as a result.

SUMMARY

The present invention relates to a storage system in order to eliminate the above-mentioned disadvantages and to bring new advantages to the related technical field.

An object of the invention is to provide a storage system for keeping hazelnuts.

Another object of the invention is to provide an improved storage system for the storage and transportation of hazelnuts.

Another object of the invention is to provide a storage system that can allow the hazelnuts in it to be circulated.

The present invention is at least one storage system with at least one chamber in which hazelnuts can be accumulated at least over a period of time in order to realize all the objects that are mentioned above and will emerge from following detailed description. Accordingly, its novelty is that it comprises at least one feeding device that can allow hazelnuts to be loaded into said chamber by means of transport elements, at least one discharge device that can allow hazelnuts in the chamber to be evacuated by means of transport elements, at least one transfer elevator that can take the hazelnuts from said discharge device and load them into said feeding device to ensure that the hazelnuts in the chamber are at least partially circulated. Thus, steps such as systematically loading hazelnuts into the chamber, evacuating hazelnuts from the chamber, and circulating the hazelnuts in the chamber are easily performed.

A possible embodiment of the invention is characterized in that said chamber is provided in multiple numbers within a predetermined order. Thus, it is possible to store hazelnuts in more volumes and more categories.

Another possible embodiment of the invention is characterized in that it comprises at least one feeding main transport element for allowing hazelnuts to be fed to the chambers in the feeding device, at least one feeding intermediate conveying element positioned to extend from said feeding main transport element to each chamber. Thus, it is ensured that the hazelnuts can be fed to whichever of the multiple chambers as desired.

Another possible embodiment of the invention is characterized in that it comprises at least one filling elevator to which it is connected in order to provide hazelnut loading to the feeding main transport element in the feeding device. Thus, it is ensured that the feeding main transport element can be associated with the hazelnut source in the external environment.

Another possible embodiment of the invention is characterized in that it comprises at least one discharge intermediate transport element that can be connected to each chamber to allow hazelnut evacuation from the chambers in the discharge device, at least one discharge main transport element where said discharge intermediate transport elements are joined. Thus, it is ensured that the hazelnuts can be discharged from whichever chamber it is desired to be discharged.

Another possible embodiment of the invention is characterized in that said discharge main transport element is connected to at least one evacuation transport element. Thus, it is ensured that the hazelnuts taken from the chamber can be loaded mechanically on a vehicle.

Another possible embodiment of the invention is characterized in that said discharge main transport element is connected to at least one hazelnut processing plant. Thus, it is ensured that the storage system can be used before a hazelnut processing facility.

Another possible embodiment of the invention is characterized in that at least one of said feeding main transport element, feeding intermediate conveying element, discharge main transport element, discharge intermediate transport element and evacuation transport element is a spiral conveyor-type carrier. Thus, the hazelnuts are moved from one place to another by means of spiral carriers.

Another possible embodiment of the invention is characterized in that at least a part of the energy it needs is obtained from at least one renewable energy source. Thus, the energy load of the storage system is reduced.

BRIEF DESCRIPTION OF THE DRAWINGS

A representative frontal view of the storage system of the invention is given in FIG. 1.

A representative rear view of the storage system of the invention is given in FIG. 2.

Figure 3:
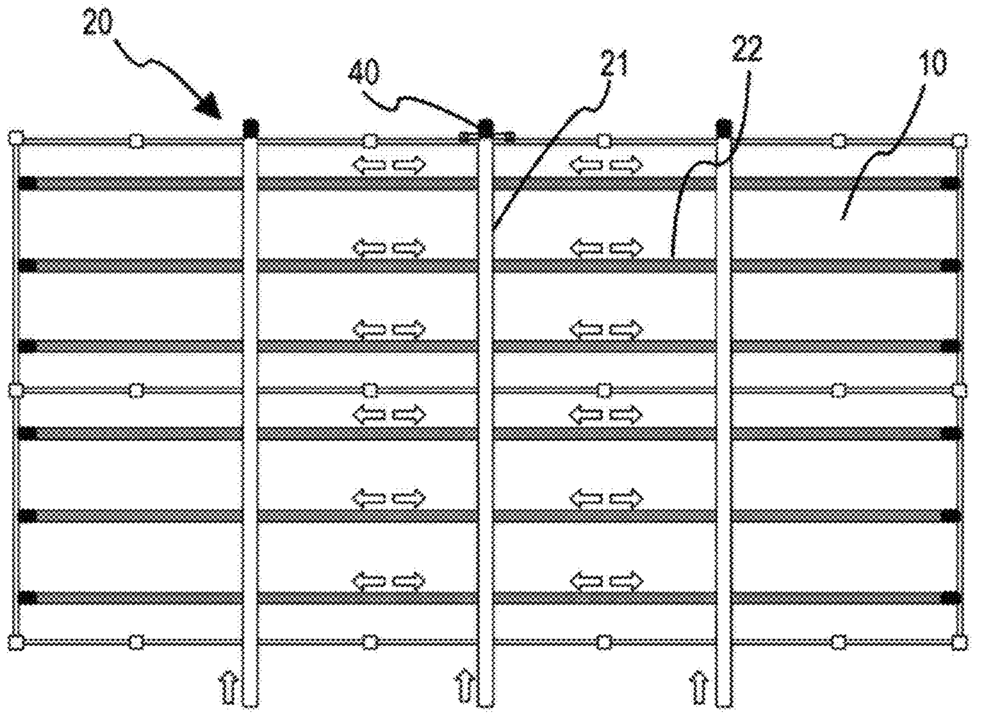

A representative top view of the storage system of the invention is given in FIG. 3.

Figure 4:
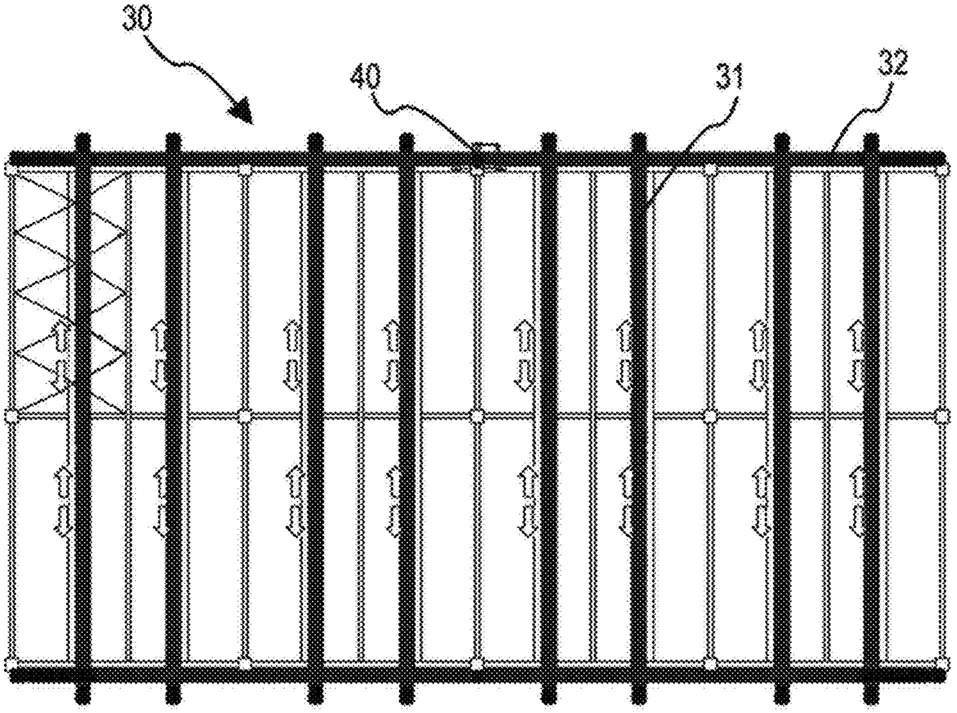

A representative bottom view of the storage system of the invention is given in FIG. 4.

REFERENCE NUMBERS GIVEN IN THE FIGURE

1 Storage System
10 Chamber
11 Ceiling
12 Base
13 Curved Form
20 Feeding Device
21 Feeding Main Transport Element
22 Feeding Intermediate Conveying Element
23 Filling Elevator
24 Casting Department
25 Cat Ladder
26 Processing Plant
30 Discharge Device
31 Discharge Main Transport Element
32 Discharge Intermediate Transport Element
33 Evacuation Transport Element
40 Transfer Elevator.

DETAILED DESCRIPTION OF THE EMBODIMENTS

The subject of the invention is explained with examples that do not have any limiting effect only for a better understanding of the subject in this detailed description.

Figure 1:
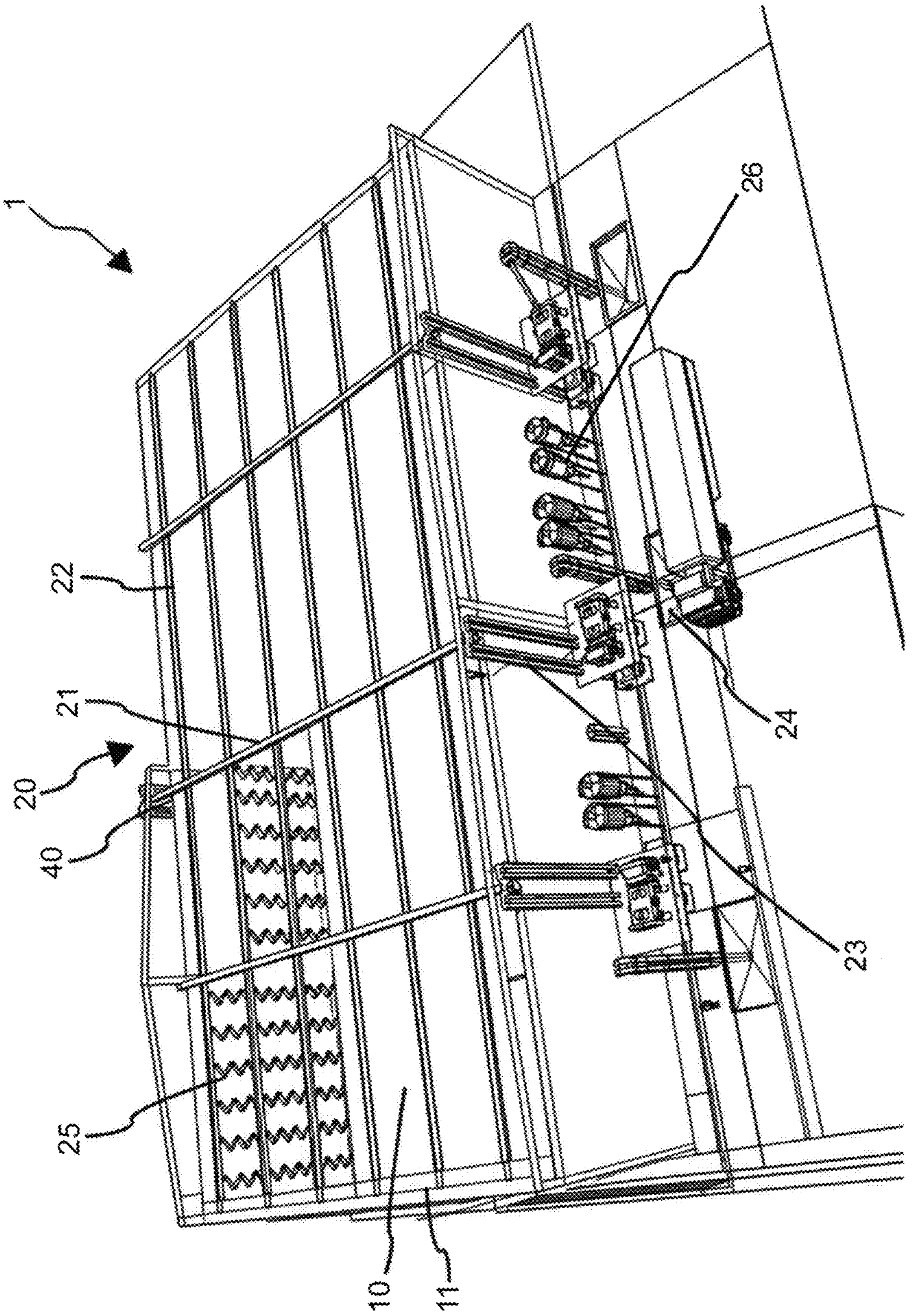

Representatives view of the feeding device (20) in the storage system (1) of the invention are given in FIGS. 1 and 3. Accordingly, said storage system (1) is a logistics element that can allow hazelnuts to be kept at least for a while. Hazelnuts kept in this storage system (1) can preferably be shelled hazelnuts. However, the invention is not limited to this, it can also be used to keep the hazelnut kernels or the shells separated from the hazelnuts. Hazelnut processing facilities can be included in the usage areas of the storage system (1). It can be ensured that the hazelnuts to be processed in the hazelnut processing facility are accumulated if the storage system (1) is used in hazelnut processing facilities. The storage system (1) can also be used to keep hazelnuts for a short or long time before using for different purposes in other embodiments. Briefly, an advantage is provided in that hazelnuts are kept in an ordered way in an area where the storage system (1) is installed and are transported when desired with the storage system (1).

There is at least one chamber (10) on the storage system (1) in which hazelnuts can be accumulated. Said chamber (10) may be of different sizes depending on the amount of hazelnuts to be collected and on the need. There may be 8 chambers (10) arranged as 2×4 in the storage system (1) in a possible embodiment of the invention. With the fact that the chamber (10) is provided in multiple numbers in this way, it can be ensured that both more hazelnuts are accumulated in volume and hazelnuts with different properties are categorized separately. The chamber has a base (12) and a ceiling (11). The said ceiling (11) part is essentially the side of the chamber (10) facing the sky. The feeding of the chamber (10) is made from this ceiling (11) part. Said base (12) part is the part on which the hazelnuts are placed by gravity in the chamber (10). The base (12) of the chamber (10) preferably has at least one curved form (13). Said curved form (13) may be substantially inclined to 270 relative to the ground. It is ensured by means of the curved form (13) that the hazelnuts can flow while they are evacuated from the chamber (10) and it is prevented that there is a need for extra personnel.

There is at least one feeding device (20) for filling the hazelnuts into the chamber (10); at least one discharge device (30) for using in the evacuation of the hazelnuts from the chamber (10) and at least one transfer elevator (40) in the chamber (10) that can allow the circulation of the hazelnuts in the storage system (1). The technical details and benefits of these elements will be explained below.

The feeding device (20) in the storage system (1) is used for loading the hazelnuts into the chamber (10) as mentioned. The feeding device (20) has at least one feeding main transport element (21) in order to do this. Said feeding main transport element (21) is essentially positioned around the ceiling (11) part of the chambers (10). The feeding main transport element (21) is connected with at least one filling elevator (23). Said filling elevator (23) is also connected with at least one casting department (24). Said casting department (24) is the part where the hazelnuts can be cast on it by stacking. This casting process can be a structure formed in a way that a truck, semi-trailer truck, tractor, bucket-like element can cast hazelnuts. Said filling elevator (23) can be a structure configured to raise the hazelnuts it receives from the casting department (24) throughout the chamber (10). It is ensured in this way that the hazelnuts are taken from the casting department (24) and transferred to the feeding main transport element (21). The feeding main transport element (21) is designed to advance the hazelnuts taken from the filling elevator (23) at the tops of the chambers (10).

The feeding main transport element (21) is connected with at least one feeding intermediate conveying element (22) positioned in a predetermined order in the ceilings (11) of the chambers (10). The feeding intermediate conveying element (22) may be an element formed at substantially smaller sizes of the feeding main transport element (21) in a possible embodiment of the invention. Thanks to the feeding intermediate conveying element (22), the hazelnuts taken from the feeding main transport element (21) are carried to a predetermined end point on the chambers (10) and released into the chamber (10). These released hazelnuts are dropped into the chamber (10) by means of at least one cat ladder (25). The hazelnut speed is reduced and the hazelnuts are transferred without damage in this way. The feeding main transport element (21), the filling elevator (23) and the casting department (24) are provided in multiple numbers in a possible embodiment of the invention. The purpose of providing this structure in multiple numbers is to increase the filling speed of the storage system (1). The feeding main transport element (21) and its related elements are provided three in number in the storage system (1) in a possible embodiment of the invention. These feeding main transport elements (21) are located on the walls of the chamber (10) so that they are essentially parallel to each other on the storage system (1). The feeding intermediate conveying element (22) is also provided in multiple numbers on the storage system (1) and extends on the chambers (10) so as to be perpendicular to the feeding main transport elements (21). Preferably, the feeding intermediate conveying elements (22) are provided on each chamber (10) in a number corresponding to three. The feeding intermediate conveying elements (22), whose ends intersect by lying on different chambers (10), are connected to each other and allow the transportation of hazelnuts between them. The hazelnuts can be carried from one end to another across the chambers (10) positioned side by side and discharged into the desired chamber (10) in this way. In addition, the feeding intermediate conveying element (22) can be used in two directions in such a way that they can carry in opposite directions. The hazelnuts taken from the feeding main transport element (21) are turned towards any of the opposite chambers (10) and cast into the desired chamber (10) in this way.

Figure 2:
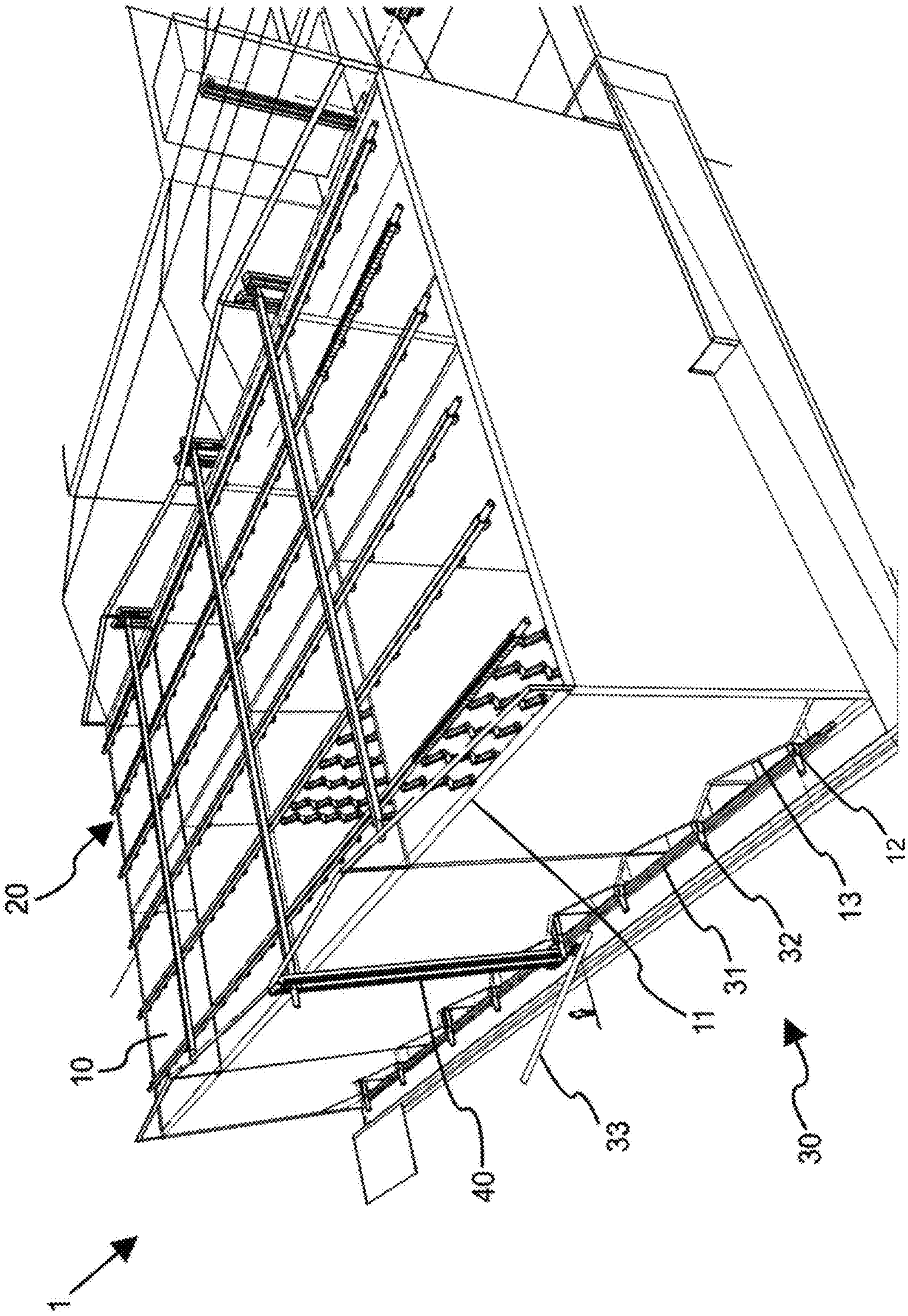

Representative views of the discharge device (30) in the storage system (1) of the invention are given in FIGS. 2 and 4. Accordingly, the discharge device (30) in the storage system (1) is used for the evacuation of the hazelnuts from the chamber (10) as mentioned. The discharge device (30) has at least one discharge main transport element (31) in order to do this. Said discharge main transport element (31) is essentially positioned around the base (12) of the chamber (10). Two discharge main transport elements (31) are provided so that they are preferably parallel to each other on the opposite sides of the storage system (1). The discharge main transport element (31) takes the hazelnuts and allows them accumulated in the chamber (10) to be evacuated (loaded to different operations, vehicles, etc.). These discharge main transport elements (31) are connected with each other at least one discharge intermediate transport element (32) between them. Said discharge intermediate transport element (32) is connected with the base (12) parts of the chambers (10). The discharge intermediate transport elements (32) are positioned at the base (12) part, especially around the bottom part of the curved form (13). The hazelnut discharge is transferred to the discharge intermediate transport element (32) by means of the automatic proportional opening and closing flaps at the bottom of the curved form (13). The best hazelnut intake efficiency can be achieved while evacuating the hazelnuts in the chamber (10) in this way. The discharge intermediate transport element (32) is positioned so as to be two in number for each chamber (10) and perpendicular to the discharge main transport elements (31) in a possible embodiment of the invention. It is ensured in this way that the hazelnut discharge in the chambers (10) can be easily and quickly transferred to the discharge main transport elements (31).

The discharge intermediate transport element (32) may be a transport element formed at substantially smaller sizes of the discharge main transport element (31) in a possible embodiment of the invention. Hazelnuts can be collected from all chambers (10) and transported to the discharge main transport elements (31) thanks to the discharge intermediate transport elements (32). The intersecting discharge intermediate transport elements (32) are connected to each other and hazelnuts can be carried between them. The hazelnuts can be carried from one end to another across the chambers (10) positioned side by side and discharged in this way. In addition, the discharge intermediate transport element (32) is configured to move in two directions in such a way that it can carry hazelnuts in opposite directions. The hazelnut taken from the chamber (10) can be directed towards whichever of the discharge main transport element (31) as desired in this way.

We have mentioned that there are two discharge main transport elements (31) that are positioned opposite to each other. Preferably, one of them is connected with a hazelnut processing plant (26), while the other is connected with at least one evacuation transport element (33). Said hazelnut processing facility may include a number of processing steps that can allow the processing of hazelnuts. Said evacuation transport element (33) can at least partially move the hazelnuts taken from the discharge main transport element (31) and transfer them to the truck, semi-trailer truck, tractor, bucket-like element.

There is a transfer elevator (40) between the feeding device (20) and the discharge device (30) in the storage system (1). Said transfer elevator (40) allows the transfer of the hazelnuts taken from the discharge device (30) back to the feeding device (20). The transfer elevator (40) is preferably configured to move the hazelnuts at a certain elevation difference in order to do this. The purpose of this transfer elevator (40) is to circulate the hazelnuts in the chamber (10). In other words, if the hazelnuts in the chamber (10) have a humidity above the critical humidity value, problems such as heat and mold may be encountered if they are kept in the chamber (10) for a certain period of time. However, with the presence of the transfer elevator (40) between the feeding device (20) and the discharge device (30), it can be ensured that the hazelnuts are circulated separately for each chamber (10).

At least one of the feeding main transport element (21), feeding intermediate conveying element (22), discharge main transport element (31), discharge intermediate transport element (32) and evacuation transport element (33) mentioned in the invention is a spiral conveyor-type carrier. All of these transport elements are carriers in the spiral conveyor-type in a possible embodiment of the invention. The spiral-type conveyor is configured to provide the transportation of cast hazelnuts horizontally, obliquely or vertically in a groove or pipe with continuous or dashed spiral screw shafts and spiral sheets in the form of rotary screws. It can be ensured that they are displaced without breaking damage by transporting hazelnuts with spiral-type conveyors.

The shelled hazelnuts are at least partially cleaned from the foreign substances in them by means of a pre-cleaning system and cast from the hazelnut casting department (24) and transferred to the feeding main transport element (21) through the filling elevator (23) in a possible use of the invention. This can be done with multiple filling elevators (23) and feeding main transport element (21). The hazelnuts transferred to the feeding main transport element (21) is carried out by means of a feeding intermediate conveying element (22) according to which of the chambers (10) positioned side by side are desired to be discharged and the casting process is carried out. The feeding of the chambers (10) can be done together or separately by means of these feeding intermediate conveying elements (22). Hazelnut feeding to the chambers (10) away from the feeding main transport element (21) can be done by connection between the feeding intermediate conveying elements (22) during the feeding of the hazelnuts. The discharge device (30) is activated in the discharge process. The discharge intermediate transport elements (32) transfer the hazelnuts taken from the base (12) of the chambers (10) to the discharge main transport elements (31). The transport process is then completed by transferring from the discharge main transport element (31) to the hazelnut processing plant (26) or evacuation transport element (33). A transfer elevator (40) is used for the mixing function in addition to filling and discharging operations in the storage system (1). The discharge device (30) is operated for the chamber (10) to be circulated, and the circulation is made by casting the hazelnuts into transfer elevator (40) and then into the same chamber (10) or a different chamber (10) through the feeding device (20) in this embodiment.

The energy needed by the storage system (1) is supplied from a renewable energy source in an alternative embodiment of the invention. The renewable energy source mentioned is the solar panel in a possible embodiment of the invention. The solar panel converts the energy of the sun directly into electrical energy with the photovoltaic effect it can have. Photovoltaic panels generate electricity when exposed to direct sunlight. Energy is saved by providing at least part of the energy need for storage in this way.

The problems of transportation of hazelnuts during storage and storage itself are eliminated with this whole embodiment. Each chamber (10) in the storage system (1) can be filled and discharged separately. In addition, a possible molding and heating problem is prevented by circulating the hazelnuts in the chamber (10) with the transfer elevator (40) configuration. The storage system (1) can be operated and controlled with low personnel and energy needs thanks to its control with full automation.

The scope of protection of the invention is specified in the attached claims and cannot be limited to those explained for sampling purposes in this detailed description. It is evident that a person skilled in the art may exhibit similar embodiments in light of above-mentioned facts without drifting apart from the main theme of the invention.

What is claimed is:

1. A storage system with a plurality of chambers in which hazelnuts can be accumulated over a period of time, comprising:

at least one feeding device that can allow the loading of hazelnuts into the chambers by means of transport elements;

at least one discharge device that can ensure that the hazelnuts in the chambers are evacuated by means of transport elements; and at least one transfer elevator that can take the hazelnuts from said discharge device and load them into said feeding device to ensure that the hazelnuts in the chambers are at least partially circulated; wherein the plurality of chambers are arranged in a predetermined order, wherein each chamber has a base having at least one curved form and automatic proportional opening and closing flaps at the bottom of the curved form;

the storage system comprises at least one discharge intermediate transport element that can be connected to each chamber to allow hazelnut evacuation from the chambers in the discharge device, a first discharge main transport element and a second discharge main transport element positioned opposite to each other, wherein the at least one discharge intermediate transport element is joined to at least one of the first discharge main transport element and the second discharge main transport element; and the first discharge main transport element is connected to at least one hazelnut processing plant external to the storage system, and the second discharge main transport element is connected to at least one evacuation transport element.

2. The storage system according to claim 1, further comprising at least one feeding main transport element for allowing hazelnuts to be fed to the chambers in the feeding device, at least one feeding intermediate conveying element positioned to extend from the feeding main transport element to each chamber.

3. The storage system according to claim 2, further comprising at least one filling elevator connected to the feeding main transport element in the feeding device.

4. The storage system according to claim 3, wherein at least one of the transport elements is a spiral conveyor-type carrier.

5. The storage system according to claim 3, wherein the storage system comprises at least one solar panel, wherein the solar panel is electrically coupled to supply at least part of the energy needed by the storage system.

6. The storage system according to claim 2, wherein at least one of the transport elements is a spiral conveyor-type carrier.

7. The storage system according to claim 2, wherein the storage system comprises at least one solar panel, wherein the solar panel is electrically coupled to supply at least part of the energy needed by the storage system.

8. The storage system according to claim 1, wherein at least one of the transport elements is a spiral conveyor-type carrier.

9. The storage system according to claim 8, wherein the storage system comprises at least one solar panel, wherein the solar panel is electrically coupled to supply at least part of the energy needed by the storage system.

10. The storage system according to claim 1, wherein the storage system comprises at least one solar panel, wherein the solar panel is electrically coupled to supply at least part of the energy needed by the storage system.

* * * * *